(12) United States Patent
Narayan et al.

(10) Patent No.: US 7,985,794 B2
(45) Date of Patent: Jul. 26, 2011

(54) STARCH-POLYESTER BIODEGRADABLE GRAFT COPOLYMERS AND A METHOD OF PREPARATION THEREOF

(75) Inventors: Ramani Narayan, Okemos, MI (US); Sunder Balakrishnan, Okemos, MI (US); Yogaraj Nabar, East Lansing, MI (US); Jean-Marie Raquez, East Lansing, MI (US); Philippe Dubois, Ciplet (BE)

(73) Assignee: Board of Trustees of Michigan State University, East Lansing, MI (US)

(*) Notice: Subject to any disclaimer, the term of this patent is extended or adjusted under 35 U.S.C. 154(b) by 0 days.

(21) Appl. No.: 12/592,996

(22) Filed: Dec. 7, 2009

(65) Prior Publication Data

US 2010/0120943 A1    May 13, 2010

Related U.S. Application Data (63) Continuation of application No. 10/993,186, filed on Nov. 19, 2004, now Pat. No. 7,629,405.

(51) Int. Cl.
C08B 31/02 (2006.01)
C08L 3/00 (2006.01)
C08L 3/02 (2006.01)
C08L 3/12 (2006.01)

(52) U.S. Cl. ............ 524/445; 523/128; 524/18; 524/47; 524/386; 524/387; 524/447; 524/449; 525/54.24; 527/300; 527/305; 527/315

(58) Field of Classification Search .................. 523/128; 524/18, 47, 386, 387, 447, 449; 525/54.24; 527/300, 305, 315
See application file for complete search history.

(56) References Cited

U.S. PATENT DOCUMENTS

| | | |
|---|---|---|
| 4,026,849 A | 5/1977 | Bagley et al. |
| 4,673,438 A | 6/1987 | Wittwer |
| 4,863,655 A | 9/1989 | Lacourse et al. |
| 5,035,930 A | 7/1991 | Lacourse et al. |
| 5,043,196 A | 8/1991 | Lacourse et al. |
| 5,095,054 A | 3/1992 | Lay et al. |
| 5,185,382 A | 2/1993 | Neumann et al. |
| 5,208,267 A | 5/1993 | Neumann et al. |
| 5,234,977 A | 8/1993 | Bastioli et al. |
| 5,256,711 A | 10/1993 | Tokiwa et al. |
| 5,262,458 A | 11/1993 | Bastioli et al. |
| 5,272,181 A | 12/1993 | Boehmer et al. |
| 5,275,774 A | 1/1994 | Bahr et al. |
| 5,280,055 A | 1/1994 | Tomka |
| 5,288,765 A | 2/1994 | Bastioli et al. |
| 5,314,934 A | 5/1994 | Tomka |
| 5,360,830 A | 11/1994 | Bastioli et al. |
| 5,382,611 A | 1/1995 | Stepto et al. |
| 5,405,564 A | 4/1995 | Stepto et al. |
| 5,412,005 A | 5/1995 | Bastioli et al. |
| 5,462,980 A | 10/1995 | Bastioli et al. |
| 5,462,983 A | 10/1995 | Bloembergen et al. |
| 5,496,895 A | 3/1996 | Chinnaswamy et al. |
| 5,500,465 A | 3/1996 | Krishnan et al. |
| 5,512,378 A | 4/1996 | Bastioli et al. |
| 5,540,929 A | 7/1996 | Narayan et al. |
| 5,554,660 A | 9/1996 | Altieri et al. |
| 5,578,691 A | 11/1996 | Narayan et al. |
| 5,616,671 A | 4/1997 | Narayan et al. |
| 5,665,786 A | 9/1997 | Xu et al. |
| 5,719,214 A | 2/1998 | Tanaka et al. |
| 5,736,586 A | 4/1998 | Bastioli et al. |
| 5,801,207 A | 9/1998 | Bastioli et al. |
| 5,844,023 A | 12/1998 | Tomka |
| 5,854,345 A | 12/1998 | Xu et al. |
| 5,861,461 A | 1/1999 | Lee et al. |
| 5,869,647 A | 2/1999 | Narayan et al. |
| 6,011,092 A * | 1/2000 | Seppala et al. .................. 524/47 |
| 6,124,384 A | 9/2000 | Shiraishi et al. |
| 6,150,438 A * | 11/2000 | Shiraishi et al. ................ 524/35 |
| 6,184,261 B1 | 2/2001 | Biby et al. |
| 6,214,907 B1 | 4/2001 | Tomka |
| 6,235,816 B1 | 5/2001 | Loercks et al. |
| 6,277,899 B1 | 8/2001 | Bastioli et al. |
| 6,472,497 B2 | 10/2002 | Loercks et al. |
| 7,153,354 B2 | 12/2006 | Narayan et al. |
| 7,629,405 B2 * | 12/2009 | Narayan et al. ............... 524/445 |
| 2001/0014388 A1 | 8/2001 | Bastioli et al. |
| 2004/0122135 A1 * | 6/2004 | Halley et al. .................... 524/47 |

OTHER PUBLICATIONS

W. Wiedmann, and E. Strobel, "Compounding of Thermoplastic Starch with Twin-screw Extruders", Starch, 43, 138-145 (1991).
R.L. Shorgen, G.F. Fanta, and W.M. Doane, "Development of Starch Based Plastics—A Reexamination of Selected Polymer Systems in Historical Perspective", Starch, 45, 276-280 (1993).
P. Forssell, J. Mikkila, and T. Suortti, "Plasticization of Barley Starch with Glycerol and Water", J.M.S. Pure Appl. Chem. A33(5), 703-715 (1996).
R. Narayan, "Polymeric Materials from Agricultural Feedstocks", ACS Symp Ser. (1994).
J.J.G. van Soest, K. Benes, and D. deWit, "The influence of starch molecular mass on the properties of extruded thermoplastic starch", Polymer, 37, 3543-3552 (1996).
G.F. Fanta and E.B. Bagley, "Starch, Graft Copolymers", Encyclopedia of Polymer Science, John Wiley & Sons: New York, 665-699 (1970).
G.F. Fanta, "Synthesis of Graft and Block Copolymers", Block and Graft Copolymerization—vol. I, John Wiley & Sons: New York, 1-45 (1973).
F.H. Otey, R.P. Westhoff and W.M. Doane, "Starch-based blown films", ACS Ind. Eng. Chem. Prod. Res. Dev., 19, 592-595 (1980).
F.H. Otey and R.P. Westhoff, "Strach-based films. Preliminary diffusion evaluation", ACS Ind. Eng. Chem. Prod. Res. Dev., 23, 284-287 (1984).

(Continued)

*Primary Examiner* — Ana L Woodward
(74) *Attorney, Agent, or Firm* — Dickinson Wright, PLLC (57) ABSTRACT

A starch-polyester graft copolymer and chemically modified starch-polyester graft copolymer composition comprising a chemically modified starch or chemically modified starch-nanoclay product is described. The composition can be produced continuously in a twin-screw co-rotating extruder. The starch-polyester graft copolymer can be solvent cast, melt cast and blown into clear transparent film particularly for use in single use disposable applications and can be biodegradable.

47 Claims, 6 Drawing Sheets

OTHER PUBLICATIONS

F.H. Otey, R.P. Westhoff and W.M. Doane, "Strach-based blown films. 2", ACS Ind. Eng. Chem. Prod. Res. Dev., 26, 1659-1663 (1987).

"Starch: Chemistry and Technology" Chapter XIII (H. Roberts, "Starch Derivatives"), and Chapter XV (L. Kruger et al., "Production and Uses of Starch Acetates"), Academic Press (1967).

"Encyclopedia of Polymer Science and Engineering", vol. 6, 1986, pp. 571-631.

"Starch: Chemistry and Technology", Chapter X (M.W. Rutenberg, and D. Solarek, "Starch Derivatives: Production and Uses"), Academic Press, Inc. (1984).

Bhattacharya M., Vaidya U.R., Zhang D., and Narayan R., Journal of Applied Polymer Science, 57: 539 (1995).

Tuil R.V., Fowler, P., Lawrher, M., and Weber, C.J., "Properties of biobased packaging materials", in: Biobased Packaging Materials for the Food Industry—Status and Perspectives, ed. Claus J. Weber, p. 12, Nov. 2000.

Kalambur S. and Rizvi S.S.H., "An Overview of Starch-Based Plastic Blends from Reactive Extrusion", Journal of Plastic Film & Sheeting, vol. 22, Jan. 2006.

Averous L., Fringant C., and Moro L., "Starch-based Biodegradable Materials Suitable for Thermoforming Packaging", Starch/Starke, 53: 368-371 (2001).

Zobel H.F., "Molecules to granules: a comprehensive starch review", Starch/Starke, 40(2): 44-50 (1988).

Van Soest, J.J.G., Knooren, N., "Influence of Glycerol and Water Content on the Structure and Properties Extruded Starch Plastic Sheets During Aging", Journal of Applied Polymer Science, 64: 1411-1422 (1997).

Vaidya U.R. and Bhattacharya M., Journal of Applied Polymer Science, 52: 617-628 (1994).

Mani R. and Bhattacharya M., European Polymer Journal, 34: 1467-1475 (1998).

Carlson, D.L., Nie, L., Narayan, R., Dubois, P., Journal of Applied Polymer Science, 72: 477-485 (1999).

Wu, C-S., "Physical properties and biodegradability of maleated-polycaprolactone/starch composite", Polymer Degradation and Stability, 80: 127-134 (2003).

Nabar Y., Raquez J.M., Dubois P., Narayan R., "Production of starch foams by twin-screw extrusion: Effect of maleated poly(butylene adipate-co-terephthalate) as a compatibilizer", Biomacromolecules, 6: 807-817 (2005).

Dubois P. and Narayan R., "Biodegradable Compositions by Reactive Processing of Aliphatic Polyester/Polysaccharide Blends", Macromolecular Symposia, 198: 233-243 (2003).

Huneault M.A. and Li H., "Morphology and Properties of compatibilized polylactide/thermoplastic starch blends", Polymer, 48: 270-280 (2007).

Chandra R. and Rustgi R., "Biodegradation of maleated linear low-density polyethylene and starch blends", Polymer Degradation and Stability, 56: 185-202 (1997).

Shujun W., Jiugao Y., and Jinglin Y., "Preparation and characterization of compatible thermoplastic starch/polyethylene blends", Polymer Degradation and Stability, 87: 395-401 (2005).

Rindlav-Westling A., Stading M., Hermansson A.M. & Gatenholm P., "Structure, mechanical and barrier properties of amylose and amylopectin films", Carbohydrate Polymers, 36: 217-224 (1998).

Lourdin D., Della Valle G., Colonna P., "Influence of amylose content on starch films and foams", Carbohydrate Polymers, 27: 261-270 (1995).

Tharanathan R.N., "Biodegradable films and composite coatings: past, present and future", Trends in Food Science and Technology, 14: 71-78 (2003).

Alves V.D., Mali S., Grossmann M.V., and Beleia A., "Effect of glycerol and amylose enrichment on cassava starch, film properties", Journal of Food Engineering, 78(3): 941-946 (2007).

Myllarinen P., Partanen R., Seppala J., and Forssell P., "Effect of glycerol on behavior of amylose and amylopectin films", Carbohydrate Polymers, 50: 355-361 (2002).

Mali S., Grossmann M.V.E., Garcia M.A., Martino M.N., and Zaritzky N.E., "Microstructural characterization of yam starch films", Carbohydrate Polymers, 50: 379-386 (2002).

International Preliminary Report on Patentability and International Search Report for PCT/US/041238, (2006).

\* cited by examiner

STARCH-POLYESTER BIODEGRADABLE GRAFT COPOLYMERS AND A METHOD OF PREPARATION THEREOF

CROSS-REFERENCE TO RELATED APPLICATIONS

This application is a continuation of U.S. patent application Ser. No. 10/993,186, filed Nov. 19, 2004 (now U.S. Pat. No. 7,629,405), which is incorporated herein by reference in its entirety.

STATEMENT REGARDING FEDERALLY SPONSORED RESEARCH OR DEVELOPMENT

Not Applicable.

STATEMENT REGARDING GOVERNMENT RIGHTS

None

BACKGROUND OF THE INVENTION (1) Field of the Invention

The present invention relates to starch-polyester graft copolymers. The present invention particularly relates to a chemically modified starch-polyester graft copolymer and a chemically modified starch-nano clay polyester graft copolymer. A process of making these graft copolymers using reactive processing such as reactive extrusion is disclosed. The starch-polyester graft copolymers have improved processability, surface properties, and an extended range of mechanical properties.

(2) Description of Related Art

Plastic packaging is subjected to pressure from existing and proposed environmental and disposal regulations, and market based sustainability initiatives. It presents a major disposal problem for companies and municipalities as it is lightweight and bulky and so does not lend itself to a viable economic and environmentally responsible recycling operation due to expensive handling and transportation costs. It is not biodegradable, which makes disposal in soil or composting operations untenable. Further, issues such as sustainability, industrial ecology, biodegradability, and recyclability are becoming major considerations in a company's product packaging design, especially with single use disposable packaging. Natural biopolymers provide biodegradable, sustainable solutions for the manufacture of short-life, single use disposable packaging, consumer goods, and marine plastics. Starch, an anhydroglucose polymer, offers a structural platform to manufacture sustainable, biodegradable packaging. Examples of patents that disclose the manufacture of starch and blends of starch and other polymers include U.S. Pat. No. 4,673,438 to Wittwer et al.; U.S. Pat. No. 4,095,054 to Lay et al.; U.S. Pat. No. 5,256,711 to Tokiwa et al.; U.S. Pat. No. 5,275,774 to Bahr et al.; U.S. Pat. No. 5,382,611 to Stepto et al. and U.S. Pat. No. 5,405,564 to Stepto et al. Lately, there have been business reports of the use of thermoplastic starch (TPS) as a component in multi phase blends (W. Wiedmann, and E. Strobel, *Starch,* 43, 138 (1991); R. L. Shorgen, G. F. Fanta, and W. M. Doan, *Starch,* 45, 276 (1993); P. Forssell, J. Mikkila, and T. Sourtti, *J.M.S. Pure Appl. Chem., A*33, 703 (1996); R. Narayan, *Polymers from Agricultural Co products,* ACS Symp Ser. (1994); and J. J. G. Van Soest, K. Benes, and D. de. Wit, *Polymer,* 37, 3543 (1996). Still others have manufactured thermoplastic starch blends in which native starch is initially blended with a small quantity of water and a less volatile plasticizer such as glycerin in order to form starch melts that are subjected to a degassing procedure prior to cooling and solidification in order to remove substantially all of the water therefrom. Examples of such patents include U.S. Pat. Nos. 5,412,005, 5,280,055, 5,288,765, 5,262,458, 5,462,980 and 5,512,378 to Bastioli et al.

Starch granules exhibit hydrophilic properties and strong inter-molecular association via hydrogen bonding due to the hydroxyl groups on the granule surface. The hydrophilicity and thermal sensitivity render the starch polymer unsuitable for thermoplastic applications. In this respect, some authors have emphasized on finding the optimal polymer or mixture of polymers and other admixtures in order to thereby "optimize" the properties of the starch. One drawback is that most of the polymers and other admixtures are themselves significantly more expensive than starch, which tends to increase the cost of such polymer blends compared to starch melts. Another drawback is that such additives will only be able to marginally alter the mechanical properties of the starch/polymer blends when viewed from a materials science perspective.

In order to improve on these drawbacks, graft copolymerization of vinyl monomer on the starch backbone was used to modify starch. Fanta and Bagley have reviewed the synthesis and discussed some applications of starch graft copolymers (G. F. Fanta and E. B. Bagley, *Encyclopedia of Polymer Science,* John Wiley & Sons: New York (1970); and G. F. Fanta, *Block and Graft Copolymers—Vol I,* John Wiley & Sons: New York (1973). Otey et al. (F. H. Otey, R. P. Westhoff and W. M. Doane, *Industrial Engineering Chemistry Products Research Development,* 19, 592 (1980); F. H. Otey and R. P. Westhoff, *Industrial Engineering Chemistry Products Research Development,* 23, 284 (1984); and F. H. Otey, R. P. Westhoff and W. M. Doane, *Industrial Engineering Chemistry Products Research Development,* 26, 1659 (1987)) blended starch with poly(ethylene-co-acrylic acid) (EAA). In these papers, the authors suggested the formation of hydrogen bonds between the carboxylic group in EAA and the hydroxyl group in starch. Increasing the level of starch decreased the percentage elongation of the film and increased the diffusion rate of water. Similar complexes like EAA can also be formed with the hydroxyl groups of the polyethylene-vinyl alcohol (EVOH) copolymer. They report a reaction between the anhydride group in the synthetic polymer with the —OH groups of starch. U.S. Pat. No. 5,462,983 to Bloembergen at al. reports on blends and alloys containing lignocelluloses like starch, cellulose acetate etc. U.S. Pat. No. 5,314,934 to Tomka et al. provides a process to produce a polyolefin-starch polymer blend. Ethylene/acrylate/maleic anhydride terpolymer was used as a compatibilizer. These blends were reported to be blown into film with properties comparable to LDPE. U.S. Pat. No. 5,234,977 to Bastioli et al. discloses a material used for the production of biodegradable articles in film, sheet or fiber form, which can be produced by extrusion from a molten mass that includes a synthetic thermoplastic polymer and a destructured starch to which a boron containing compound such as boric acid has been added. U.S. Pat. No. 6,277,899 to Bastioli et al. discloses a polymeric composition comprising filler melt-dispersed in a matrix comprising, a destructurized starch component, a synthetic thermoplastic polymeric component and a fluidizing agent. U.S. Pat. No. 5,412,005 to Bastioli et al. discloses biodegradable polymeric compositions containing a starch based component and a polymeric component, preferably polymers of ethylene-vinyl alcohol or polyvinylalcohol.

U.S. Pat. Nos. 6,235,816 and 6,472,497 describe starch polyester blends.

Other references are:
(1) Ramani Narayan, Steven Bloembergen and Amit Lathia, A Method of Preparing Biodegradable Modified-Starch Moldable Products and Films, U.S. Pat. No. 5,869,647, Feb. 9, 1999, July 1993;

(2) Narayan, R., Biodegradable Multi-Component Polymeric Materials Based on Unmodified Starch-Like Polysaccharides, U.S. Pat. No. 5,500,465, Oct. 31, 1995;

(3) Narayan, R., Krishnan, M., DuBois, P., Polysaccharides Grafted With Aliphatic Polyesters Derived From Cyclic Esters, U.S. Pat. No. 5,540,929, Jul. 30, 1996;

(4) Narayan, R., Krishnan, M., DuBois, P., Polysaccharides Grafted With Aliphatic Polyesters Derived From Cyclic Esters, U.S. Pat. No. 5,578,691, Nov. 26, 1996;

(5) Narayan, R., Krishnan, M., DuBois, P., Polysaccharides Grafted With Aliphatic Polyesters Derived From Cyclic Esters, U.S. Pat. No. 5,616,671, Apr. 1, 1997;

(6) Narayan, R., Balakrishnan, S., Nabar, Y., Shin, B., Dubois, P., Raquez, J., Chemically Modified Plasticized Starch Compositions by Extrusion Processing, U.S. Pat. No. 7,153,354 (U.S. patent application Ser. No. 10/993,309, co-filed with the present application on Nov. 19, 2004 (hereinafter the "copending application")), which is incorporated herein by reference.

OBJECTS

It is therefore an object of the present invention to provide novel grafted starch polyester compositions which have novel properties. It is further an object of this invention to provide economical and reproducible compositions. These and other objects will become increasingly apparent from the following description.

SUMMARY OF THE INVENTION

The present invention relates to a starch-polyester graft copolymer composition comprising starch or chemically modified starch with segments of a polyester grafted onto the starch. Preferably the chemically modified starch is a starch which is thermoplastic. Preferably the composition comprises about 0.5 to 10% by weight of the composition of a plasticizer. Preferably the composition contains natural or an organically modified nanoclay. Preferably the starch is selected from the group consisting of corn, potato, wheat, rice, sago, tapioca, waxy maize, sorghum, cassava, and high amylose starch. Preferably the chemically modified plasticized starch (CMPS) is prepared from a reactively extruded 50% to 80% by weight of the starch, a chemical modifier from 0.5% to about 10% by weight of the starch, a plasticizer from 10 to 50 wt-% of the composition, and optionally a free radical initiator in an amount ranging between 0.01 to 2.0 wt % of the composition. Preferably the chemically modified plasticized starch (CMPS) is prepared from a blend comprising starch polymer, from 50% to 80% by weight, a chemical modifier from 0.5% to about 10% by weight of the starch polymer, more preferably from 2% to 5% by weight of the starch, a plasticizer from 10 to 50 wt-% of the composition, a nanoclay, wherein the nanoclays are added in an amount ranging from 0.5 to 25 wt % of the total composition. Preferably the plasticizer is selected from the group consisting of polyhydric alcohols like glycerol, sorbitol, and ethylene glycol. Preferably the modifier is selected from the group consisting of dibasic acids or their anhydrides. Preferably the composition contains a free radical initiator. Preferably the free radical initiator is a peroxide. Preferably the composition contains a nanoclay selected from a group consisting of montmorillonite, smectite, hectorite, and mixtures thereof. Preferably the composition is completely biodegradable. Preferably the composition has been grafted in a melt phase in an extruder. Preferably the composition has been grafted in a twin screw extruder at a temperature in the range of 100° C.-200° C.

The present invention also relates to a process for the preparation of a starch polyester graft co-polymer composition which comprises blending a mixture of an organic acid or anhydride of the acid with starch or a chemically modified starch and a polyester polymer at a temperature which grafts the segments of a polyester onto the starch to form the composition.

Most preferably the present invention relates to a starch based copolymer composition which comprises a reactively extruded mixture of a biodegradable starch polymer, a chemical modifier selected from the group consisting of a dibasic organic acid, an organic anhydride of a dibasic organic acid and mixtures thereof, a plasticizer, a biodegradable polyester resin, a nanoclay, and optionally a free radical initiator, wherein the mixture has been extruded, with heating and venting of water from the mixture.

Most preferably the present invention also relates to a process for preparing a starch based composition which comprises reactively extruding a mixture which comprises a reactively extruded mixture of a biodegradable starch polymer, a chemical modifier selected from the group consisting of a dibasic organic acid, an organic anhydride of a dibasic organic acid and mixtures thereof, a plasticizer, a biodegradable polyester resin, a nanoclay, and optionally a free radical initiator, wherein the mixture has been extruded, with heating and venting of water from the mixture.

In the present invention the mechanism of reaction is that the fragments of a polyester resin from the processing react with hydroxyl groups of the starch. The acid or anhydride reacts with the polyester polymer to produce the reactive fragments. Thus the present invention provides a unique composition with the fragments of the polyester polymer bonded to the starch.

The present invention particularly provides new amphiphilic, starch-polyester graft copolymer and chemically modified starch-polyester graft copolymer compositions comprising a chemically modified starch or chemically modified starch-nanoclay product produced continuously in a twin-screw co-rotating extruder. The chemically modified plasticized starch product with lower viscosity and good processability and the chemically modified plasticized starch-nano clay product is described in the copending patent application. The chemically modified plasticized starch composition (CMPS) can be prepared by the reactive blending or extrusion processing of starch in the presence of chemical modifiers, a plasticizer and an optional free-radical initiator, more specifically by reacting starch with a dibasic acid or anhydride of the acid as the chemical modifier in the presence of plasticizer and an optional free radical initiator for the acid or anhydride to provide the plasticized starch compositions which have improved processability and reduced viscosity. The chemically modified starch ester product may preferentially be formed by reaction of the starch hydroxyl groups with a dibasic acid or cyclic anhydride to obtain ester linkages with pendant carboxylic groups as shown in Scheme I:

Maleation Chemistry

-continued

Transesterification Chemistry

The starch-polyester graft copolymers of the present invention can be readily blown, extrusion cast into film, and molded. Examples of biodegradable polyesters include poly (caprolactone) (PCL), poly(vinylacetate-co-vinylalcohol) (PVAc/VA), poly(lactic acid) or polylactide (PLA), poly(g-lycolic acid) or polyglycolide (PGA), and related copolyesters including the various combinations of stereoisomers, bacterial and synthetic poly(.beta.-hydroxybutyrate) (PHB), Poly(.beta.-hydroxybutyrate-co.beta.-hydroxyvalerate) (PHBN), and other poly(.beta.-hydroxyalkanoates) (PHA), biodegradable aliphatic polyesters, and aliphatic-aromatic copolyesters. Preferably the polyester is selected from the group consisting of the composition in which the polyester is selected from the group consisting of:

where R is lower alkyl and aromatic groups containing 1 to 12 carbon atoms; n is 0 to 10; and x is 200 to 2000; and where a, b and m are 2 to 8; and x/y is between 3/2 and 10/1.

The present invention provides new polymeric materials, which are environmentally responsible and fully biodegradable as per ASTM standards.

In accordance with the present invention, there is provided a biodegradable moldable product or film prepared from a graft copolymer containing starch or chemically modified starch or chemically modified starch-nano clay composition and a polyester, which is preferably biodegradable. It has been found that new starch-polyester graft copolymers with good elongation, compressibility and surface properties.

In one embodiment of this invention, starch is extruded with aliphatic-aromatic co-polyester and particularly poly butylenes (adipate-co-terephthalate) in the presence of maleic acid as a trans-esterification catalyst to form starch-polyester graft copolymers compositions with good elongation, compressibility and surface properties. In another embodiment chemically modified starch or a chemically modified starch-nano clay product has been reacted with aliphatic and aliphatic-aromatic copolyesters to provide new graft copolymer products with enhanced properties and processability.

DETAILED DESCRIPTION OF THE INVENTION

The starting starch material useful in this invention can be any of several starches, native or modified. Such starches include those derived from any plant source including corn, potato, wheat, rice, sago, tapioca, waxy maize, sorghum and high amylose starch, i.e., starch having at least 40% and more particularly at least 65% by weight of amylose content, such as high amylose corn, etc. Starch flours can also be used as a starch source. Also included are the conversion products derived from any of the former bases including, for example, dextrin prepared by hydrolytic actions of acid and/or heat; oxidized starches prepared by treatment with oxidants such as sodium hypochlorite; fluidity or thin boiling starches prepared by enzyme conversion or mild acid hydrolysis; and derivatized and crosslinked starches. The starch percentage in the final blend is 5% to 45% by weight and preferably from 10% to 30% by weight.

The plasticizers are polyhydric alcohols, preferably glycerol sorbitol, ethylene glycol and mixtures thereof. Plasticizer concentration in the final blend is 5% to 50% by weight and preferably from 5% to 20% by weight is preferred.

Modified starches could also be used in this invention. By modified it is meant that the starch can be derivatized or modified by typical processes known in the art, e.g., esterification, etherification, oxidation, acid hydrolysis, crosslinking and enzyme conversion. Typically, modified starches include esters, such as the acetate and half-esters of dicarboxylic acids, particularly the alkenylsuccinic acids; ethers, such as the hydroxyethyl and hydroxypropyl starches and cationic starches such as starch modified with 2-diethylaminoethyl chloride (DEC) and starch modified with quaternary ammonium reagents such as 3-chloro-2-hydroxypropyltrimethylammonium chloride; starches oxidized with hypochlorite; starches reacted with crosslinking agents such as phosphorus oxychloride, epichlorohydrin, and phosphate derivatives prepared by reaction with sodium or potassium orthophosphate or tripolyphosphate and combinations thereof. These and other conventional modifications of starch are described in publications such as "Starch: Chemistry and Technology", Second Edition, Edited by Roy L. Whistler, et al., chapter X; Starch Derivations: Production and Uses by M. W. Rutenberg, et al., Academic Press, Inc. 1984.

Examples of biodegradable polyester polymers include poly(caprolactone) (PCL), poly(vinylacetate-co-vinylalcohol) (PVAc/VA), poly(lactic acid) or polylactide (PLA), poly (glycolic acid) or polyglycolide (PGA), and related copolyesters including the various combinations of stereoisomers, bacterial and synthetic poly(-hydroxybutyrate) poly(.beta.-hydroxybutyrate-co-.beta.-hydroxyvalerate) (PHB/V), and other poly(.beta.-hydroxyalkanoates) (PHA), and aliphatic-aromatic biodegradable polyesters such as ECOFLEX™.

In forming starch-polyester graft copolymers of this invention, the selected starch starting material is preferably reacted with biodegradable polyester polymers in the presence of maleic anhydride or maleic acid or mixtures thereof, which functions as a trans-esterification catalyst.

The maleic anhydride and/or its hydrolyzed acid counterpart is combined with the starch or the plasticized starch in an amount of from about 0.1 to 10% by weight of anhydride (or acid) and preferably about 0.5 to 4% anhydride (or acid) based on the dry weight of starch. The anhydride or hydrolyzed acid is usually added in the form of a fine powder and is co-extruded with the biodegradable polyester by adding it directly to the extruder. In the case of using maleated starches, maleic anhydride already present in the system functions as a catalyst and hence there is no need to add again. Other organic diacids or anhydrides can be used as described in our copending application.

While any starch may be used in this invention as noted previously, the starch materials that are particularly useful in this invention are corn, potato, tapioca and high amylose starch; i.e., starch containing at least 40% by weight and preferably at least 65% by weight of amylose. Further preferred are the starches that are modified by maleation, especially using maleic anhydride or maleic acid. Blends of two or more of the starch starting materials may be used as well as additive or synthetic compounds to improve properties such as water resistance, strength, flexibility, color, etc.

The apparatus used in carrying out the extrusion process can be any screw type extruder. While the use of a single or twin screw extruder can be used, it is preferred to use a twin-screw extruder. Such extruders will typically have rotating screws in a horizontal cylindrical barrel with an entry port mounted over one end and a shaping die mounted at the discharge end. When twin screws are used, they may be co-rotating and intermeshing or non-intermeshing. Each screw will comprise a helical flight or threaded sections and typically will have a relatively deep feed section followed by a tapered transition section and a comparatively shallow constant-depth meter section. The motor driven screws, generally fit snugly into the cylinder or barrel to allow mixing, heating and shearing of the material as it passes through the extruder.

Control of the temperature along the length of the extruder barrel is important and is accomplished in zones along the length of the screw. Heat exchange means, typically a passage such as a channel, chamber or bore located in the barrel wall, for circulating a heated media such as oil, or an electrical heater such as calrod or coil type heaters, are often used. Additionally, heat exchange means may also be placed in or along the shaft of the screw device.

Variations in any of the elements used in the extruder can be made as desired in accordance with conventional design practices. A further description of extrusion and typical design variations can be found in "Encyclopedia of Polymer Science and Engineering", Volume 6, 1986, pp. 571 to 631.

In carrying out the extrusion process, temperatures in the extruder vary depending on the particular material, desired properties and application. They generally range from about 100° C. to 250° C., and preferably will range from about 150° C. to 210° C. The total moisture content of the starch in the extruder, i.e., moisture present in the inlet feed starch as well as water in the aqueous anhydride and/or acid, is about 25% or less by weight, based on the weight of starch. More particularly, the total moisture content of the starch ranges from about 8 to 25% preferably about 10 to 21% and more preferably from about 15 to 21% by weight, based on the weight of starch.

Further, the starch-polyester graft copolymers can be manufactured in a one-step process; wherein the starch is first plasticized in a first section of the extruder followed by addition of the polyester along-with a trans-esterification catalyst to form the starch-polyester graft copolymer. Further, starch can be maleated using maleic anhydride or maleic acid in the presence of glycerol plasticizer in the first section of the extruder, followed by addition of the polyester downstream to form the starch-polyester graft copolymer.

By utilizing the starch-polyester graft copolymer, the overall processing temperature can be reduced to well below the processing temperature of the pure polyester component. This is particularly important for manufacturing with high-melting polyesters such as PHB and PHB/V, which thermally degrade at higher processing temperatures and therefore have a narrower processing window. This improvement is attributed to the compatibility achieved by the reactive blending process, resulting in changes in the crystalline microstructure of the polyester component and/or the morphology of the multi-phase material thereby rendering it processable at lower processing temperatures. It is important that the compounds be compatible.

The compositions of the present invention can retain their biodegradability if a degradable polyester polymer is used. The water resistance of the starch and modified starches is improved by graft copolymerization with high molecular weight biodegradable polyesters, especially with semi-crystalline polyesters such as PCL or PHB/V, and similar biodegradable polyesters. This is further achieved by engineering the appropriate blend composition, through the choice of polyester, starch and plasticizer.

The present invention can be processed by various methods known in the art, such as extrusion pelletizing, injection molding, and film forming. For example, the starch-polyester graft copolymer compositions made in accordance with the present invention can be injection molded to give a variety of molded products, and extrusion cast or even solution cast to give translucent flexible films, as well as transparent films.

The following experimental examples demonstrate the utility of the present invention for forming biodegradable products containing a biodegradable starch or plasticized starch and biodegradable polyester in the presence of a trans-esterification catalyst.

Examples of materials made in accordance with the present invention in compost experiments confirm biodegradability.

Example 1

Figure 1:
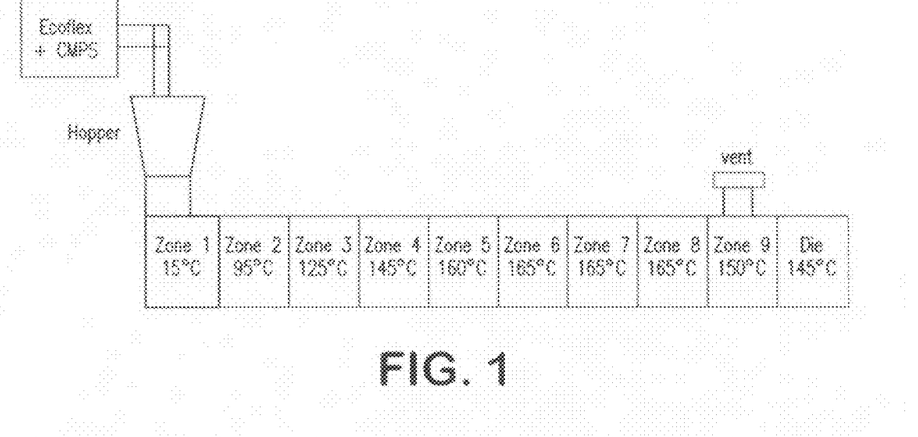
FIG. 1 is a diagram of an extrusion apparatus for the production of polyester grafted starch.
Figure 2A:
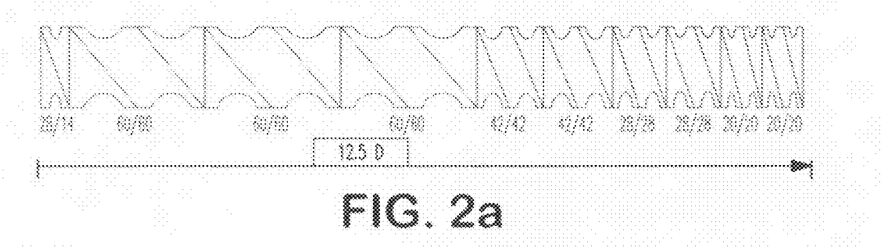
FIGS. 2A, 2B and 2C are drawings depicting the screw configuration used for the reactive extrusion production of the novel graft copolymers. The screw configuration is divided into three sections (FIG. 2A) followed by (FIG. 2B) and further followed by (FIG. 2C).
Figure 2B:
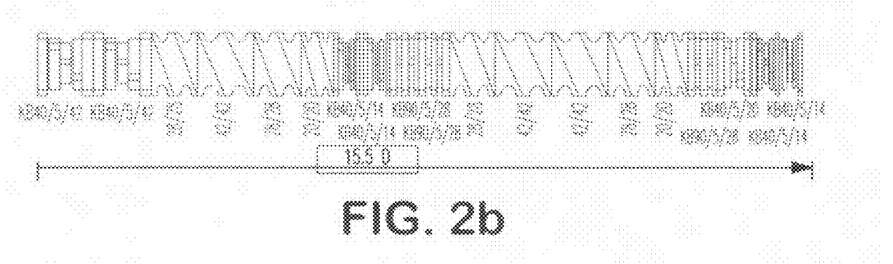
Figure 2C:
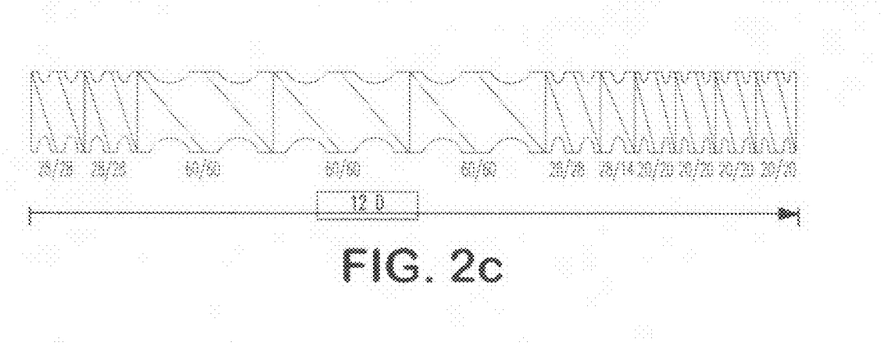

The synthesis of ECOFLEX™ (PBAT)—plasticized starch (PS) graft copolymers was accomplished in a twin-screw co-rotating CENTURY extruder using maleic acid as a trans-esterification catalyst. PS was produced by plasticization of regular corn-starch, obtained from Corn Products, Inc. (Chicago, Ill.) (moisture content of 12%) using glycerol (20-wt %) as a plasticizer in the same extruder. Maleic acid, obtained from Aldrich, was ground to a fine powder using a mortar and pestle and pre-blended with the ECOFLEX™ polyester (poly(butylene adipate-co-terephthalate)), obtained from BASF (Germany)) before being fed to the feed port of the extruder. The concentration of maleic acid used was 1-wt % with respect to the total concentration. Meanwhile, PS, previously oven dried overnight at 50° C., was ground to a fine powder and fed using an external feeder to the feed port of the extruder. The feeder rates were adjusted accordingly to obtain a ratio of 70:30 (ECOFLEX™+Maleic acid): PS. The temperature profile is shown in FIG. 1 and Table 1, and the screw configuration used is shown in FIG. 2, respectively. In FIGS. 2A, 2B and 2C, the entire screw configuration is divided into 3 sections; section 1 of 12.5D distance followed by section 2 of 15.5D distance and finally section 3 with 12D distance. The vent port was kept open to remove unreacted maleic acid and water. The extruded strand was cooled using a water bath and pelletized in line.

TABLE 1

Extrusion Processing Conditions in the synthesis of ECOFLEX-(PS/CMPS) graft copolymers

| ZONE | SET | ACTUAL | UNITS |
| --- | --- | --- | --- |
| ZONE1 | 15 | 70 | ° C. |
| ZONE2 | 95 | 99 | ° C. |
| ZONE3 | 125 | 122 | ° C. |
| ZONE4 | 145 | 149 | ° C. |
| ZONE5 | 160 | 170 | ° C. |
| ZONE6 | 165 | 192 | ° C. |
| ZONE7 | 165 | 196 | ° C. |
| ZONE8 | 165 | 193 | ° C. |
| ZONE9 | 150 | 185 | ° C. |
| DIE | 145 | 153 | ° C. |
| MELT TEMP. |  | 153 | ° C. |
| MOTOR SPEED |  | 254 | RPM |
| TORQUE |  | 67 | % |
| PRESSURE |  | 92 | Psia |
| FEEDER SPEED, CENTURY (Ecoflex + Maleic acid) |  | 135 (~8 lb/hr) | % |
| FEEDER SPEED, MINI |  |  | % |
| FEEDER SPEED, EXT (TPS) |  | 0.80 (3.4 lb/hr) | % |

Figure 3:
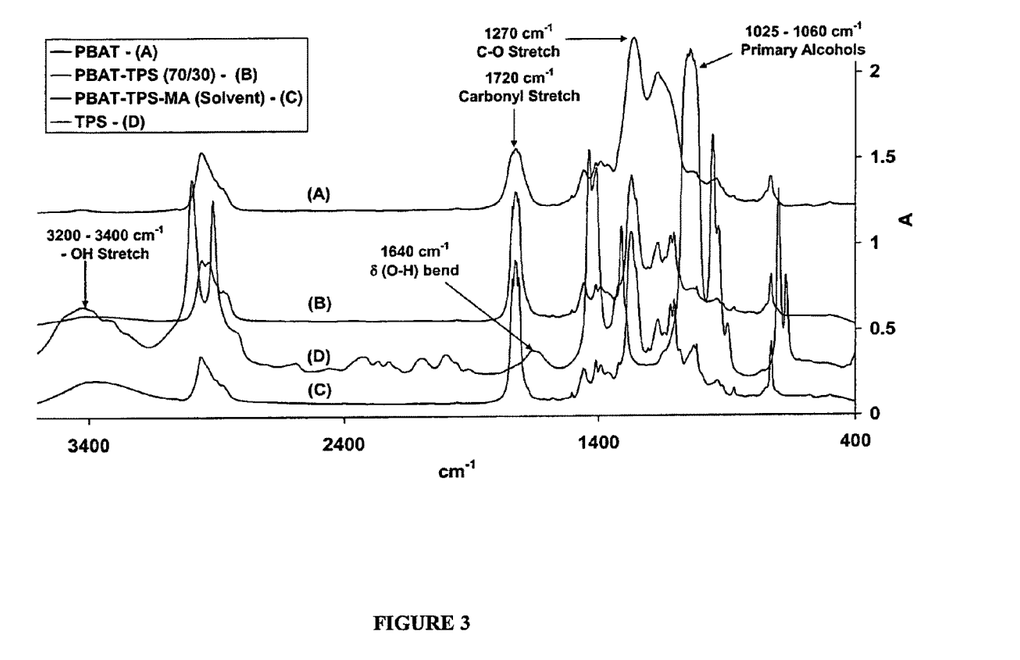
FIG. 3 is a graph showing the FTIR results of graft copolymers of ECOFLEX™, (poly(butylene adipate-co-terephthalate)), obtained from BASF (Germany), with plasticized starch (PS). To validate the reactivity, FTIR scans of pure ECOFLEX™, PS and ECOFLEX™/PS blend (without the catalyst) are also shown.

The resulting pellets were dried in an oven overnight at 75° C. The pellets were totally extracted in Dichloro methane using a Soxhlet extraction unit. The extracted graft copolymer solution was cast to form transparent films. FTIR analysis (FIG. 3) of the films confirmed reactivity and the true existence of a graft copolymer.

Example 2

The procedure of Example 1 was followed using PCL (Poly (epsilon-caprolactone), obtained from Dow Chemical (Midland, Mich.); Molecular weight of 70,000 g/mol) polyester instead of ECOFLEX™. The resulting pellets were also dried in an oven overnight at 75° C. The pellets were totally extracted in Dichloro methane using a Soxhlet extraction unit. The extracted graft copolymer solution was cast to form transparent films. FTIR analysis of the films confirmed reactivity and the true existence of a graft copolymer.

Example 3

The synthesis of starch-polyester graft copolymers was carried out as follows: Chemically modified plasticized starch (CMPS), produced by reactive extrusion processing of regular cornstarch, obtained from Corn Products (Chicago, Ill.), using maleic acid modifier, and glycerol (20-wt %) plasticizer as explained in the co-pending patent application was oven dried overnight at 75° C. and ground to a fine powder and fed using an external feeder to the feed port of the extruder. This composition is described in Applicants' co-pending application which is incorporated herein by reference. ECOFLEX™ was also fed to the feed port of the extruder using CENTURY feeder (Traverse City, Mich.). The feeder rates were adjusted accordingly to obtain a ratio of 70:30 (ECOFLEX:CMPS). The temperature profile and the screw configuration used are similar to Example 1. The vent port was kept open to remove unreacted maleic acid and water. The extruded strand was cooled using a water bath and pelletized in line. The pellets were dried in an oven overnight at 75° C., to remove surface moisture. The pellets were totally extracted in Dichloro methane using a Soxhlet extraction unit. The extracted graft copolymer solution was cast to form transparent films. FTIR analysis of the films (FIG. 4) confirmed reactivity and the true existence of a graft copolymer.

Example 4

The synthesis of starch-polyester graft copolymers was carried out as follows: Chemically modified plasticized starch (CMPS), produced by reactive extrusion processing of regular corn-starch, obtained from Corn Products, using maleic acid modifier, BENTONE 166™ (BENTONE 166™ is an alkylaryl ammonium hectorite clay, obtained from Elementis Specialties, with greatly improved dispersibility characteristics. It provides excellent mechanical strength, flame retardancy and highly improved gas barrier properties) and glycerol (20-wt %) plasticizer as explained in the co-pending patent application was oven dried overnight at 75° C. and ground to a fine powder and fed using an external feeder to the feed port of the extruder. ECOFLEX™ was also fed to the feed port of the extruder using the CENTURY™ feeder. The feeder rates were adjusted accordingly to obtain a ratio of 70:30 (ECOFLEX:CMPS). The temperature profile and the screw configuration used are similar to Example 1. The vent port was kept open to remove maleic acid and water. The extruded strand was cooled using a water bath and pelletized in line. The pellets were dried in an oven overnight at 75° C., to remove surface moisture.

Example 5

The synthesis of starch-polyester graft copolymers was carried out as follows: Chemically Modified plasticized starch (CMPS), produced by reactive extrusion processing of regular corn-starch, obtained from Corn Products, using maleic acid modifier, BENTONE 111™ (BENTONE 111™ is an organic derivative of a special smectite clay, obtained from Elementis Specialties. It provides excellent mechanical strength, flame retardancy and highly improved gas barrier properties) and glycerol (20-wt %) plasticizer as explained in the co-pending patent application was oven dried overnight at 75° C. and ground to a fine powder and fed using an external feeder to the feed port of the extruder. ECOFLEX™ was also fed to the feed port of the extruder using CENTURY™ feeder. The feeder rates were adjusted accordingly to obtain a ratio of 70:30 (ECOFLEX:CMPS). The temperature profile and the screw configuration used are similar to Example 1. The vent port was kept open to remove maleic acid and water. The extruded strand was cooled using a water bath and pelletized in line. The pellets were dried in an oven overnight at 75° C., to remove surface moisture.

Example 6

The procedure given in Example 3 was followed using polycaprolactone (PCL) polyester instead of ECOFLEX™. The resulting pellets were also dried in an oven overnight at 75° C. The pellets were totally extracted in dichloromethane using a Soxhlet extraction unit. The extracted graft copolymer solution was cast to form transparent films. FTIR analysis of the films confirmed reactivity and the true existence of a graft copolymer.

Example 7

ECOFLEX™ and cross-linked ECOFLEX™ (Cross-linked using a free radical initiator) were melt extruded with PS and CMPS in different proportions according to the procedure as explained in Example 3. All the samples were extracted in dichloromethane using a Soxhlet apparatus. The results of the extraction are shown in Table 2.

As seen from Table 2, almost complete extraction is achieved for ECOFLEX™/CMPS (70/30 w/w and 60/40 w/w) graft copolymers. When this solution was cast, a transparent film was obtained. This proves that ECOFLEX™ and CMPS are covalently linked making the graft copolymer extractable in Dichloromethane (solvent wherein ECOFLEX™ is soluble, but PS is not). However, due to the insolubility of PS in the solvent, the graft copolymer forms a colloidal dispersion and not a clear transparent solution.

This result is applicable even to blends containing CMPS made with no peroxide (see row 6 in Table 2). However, for the 50/50 and 40/60 blends, only 47% and 38% respectively (close to the respective ECOFLEX™ amount) were extracted out. This confirms the fact that ECOFLEX™ has not reacted with CMPS. Thus, the reaction is also dependent on the relative amounts of the polyester and CMPS phases present. Also, from Table 2 (rows 7 and 9), it is clearly seen that when PS is used instead of CMPS, there is very minimal or no reaction taking place. This suggests that the reaction between the hydroxyl groups in starch and the ester functionalities in ECOFLEX™ occurs only in the presence of a trans-esterification catalyst such as maleic acid. When ECOFLEX™ polyester was cross-linked and reactively blended with CMPS, around 83% of the polyester was extracted out. This could be due to the fact that certain gel (network) portions of the cross-linked polyester are impermeable to chemical reaction.

Example 8

Several graft copolymer samples, prepared using both PS and CMPS according to procedures explained in Examples 1, 3, 4 and 5 were extruded into films. Films were made using a Killion™ (Pawcatuck, Conn.) single-screw blown film unit. The screw diameter was 25.4 mm with L:D ratio of 25:1. The die inner diameter was 50.8 mm with a die gap size of 1.5 mm. The blown film processing conditions are shown in Table 3.

TABLE 2

Soxhlet Extraction results of ECOFLEX-CMPS graft copolymers

| System | Polyester (Ecoflex or LEcoflex) initially present (gm) | Starch component (PS or CMPS) initially present (gm) | Material extracted (gm) | % Extracted |
|---|---|---|---|---|
| Ecoflex/CMPS (70/30; w/w) | 1.3510 | 0.579 | 1.8878 | 98 |
| Ecoflex/CMPS (60/40; w/w) | 1.0682 | 0.7122 | 1.7010 | 96 |
| Ecoflex/CMPS (50/50; w/w) | 0.7998 | 0.7998 | 0.7503 | 47 |
| Ecoflex/CMPS (40/60; w/w) | 0.8639 | 0.5759 | 0.5513 | 38.2 |
| Ecoflex/CMPS (70/30; w/w) No Initiator used in the preparation of CMPS. | 1.9018 | 0.8150 | 2.6530 | 98 |
| Ecoflex/PS (70/30; w/w) | 1.2075 | 0.5175 | 1.2595 | 71 |
| LEcoflex/CMPS (65/35; w/w) | 3.25 | 1.748 | 4.1272 | 83 |
| LEcoflex/PS (70/30; w/w) | 1.0225 | 0.4382 | 1.0602 | 73 |

TABLE 3

Blown Film Processing Conditions for ECOFLEX-(PS/CMPS) graft copolymers

| Set (° F.)    | 70 | 350 | 355 | 360 | 360 | 395 | 395 | 300 |
|---------------|----|-----|-----|-----|-----|-----|-----|-----|
| Actual (° F.) | 73 | 351 | 358 | 357 | 360 | 380 | 395 | 300 |

| Melt (° F.)      | 364      |
|------------------|----------|
| Screw Speed (RPM)| 12.4     |
| FPM (ft/min)     | 5-6      |
| Pressure (psi)   | 500-1000 |

Figure 4:
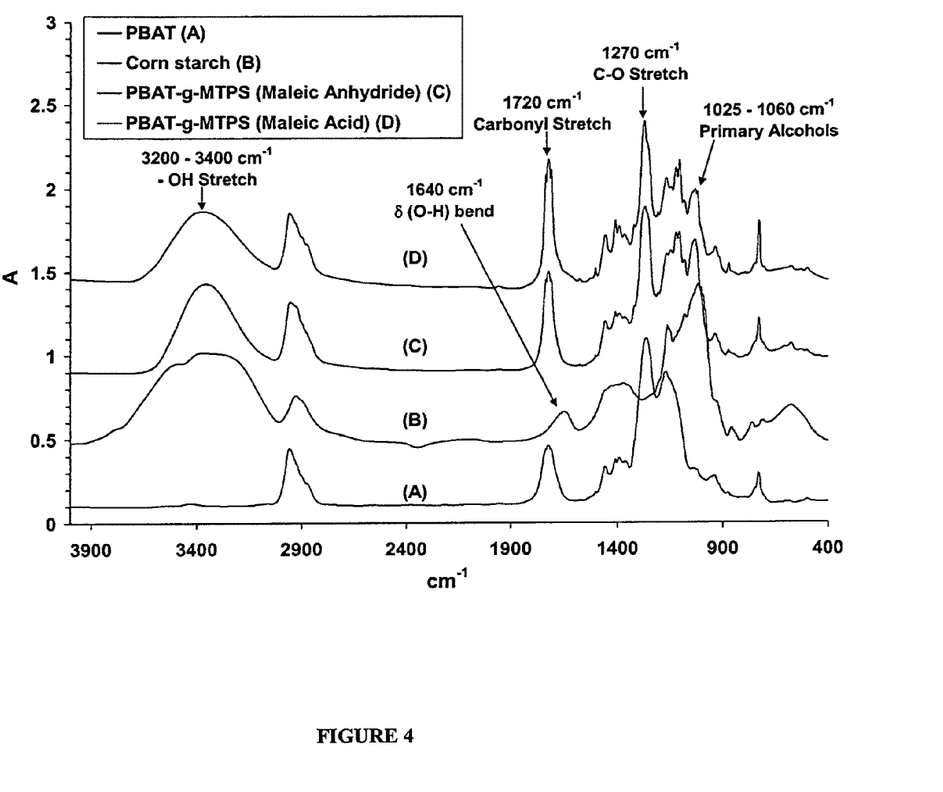
FIG. 4 is a graph showing the FTIR results of graft copolymers of ECOFLEX™ with CMPS (made using both maleic anhydride and maleic acid modifiers). To validate the reactivity, FTIR scans of pure ECOFLEX™ and regular cornstarch are also shown.
Figure 5:
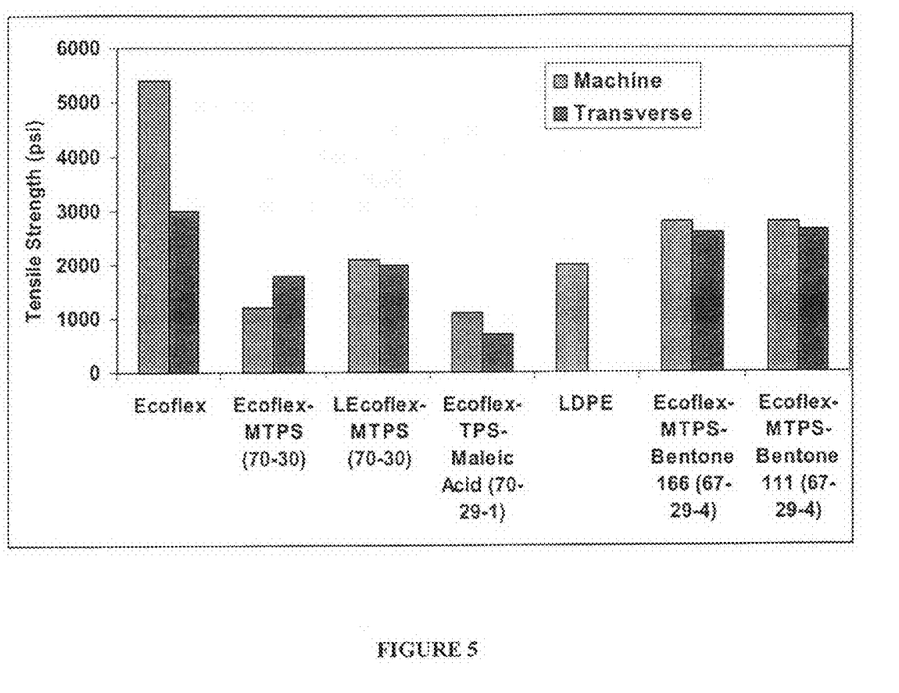
FIG. 5 shows bar graphs depicting tensile strength values of ECOFLEX™, graft copolymer of ECOFLEX™ with CMPS, graft copolymer of cross-linked ECOFLEX™ with CMPS, graft copolymer of ECOFLEX™ with PS and LDPE.
Figure 6:
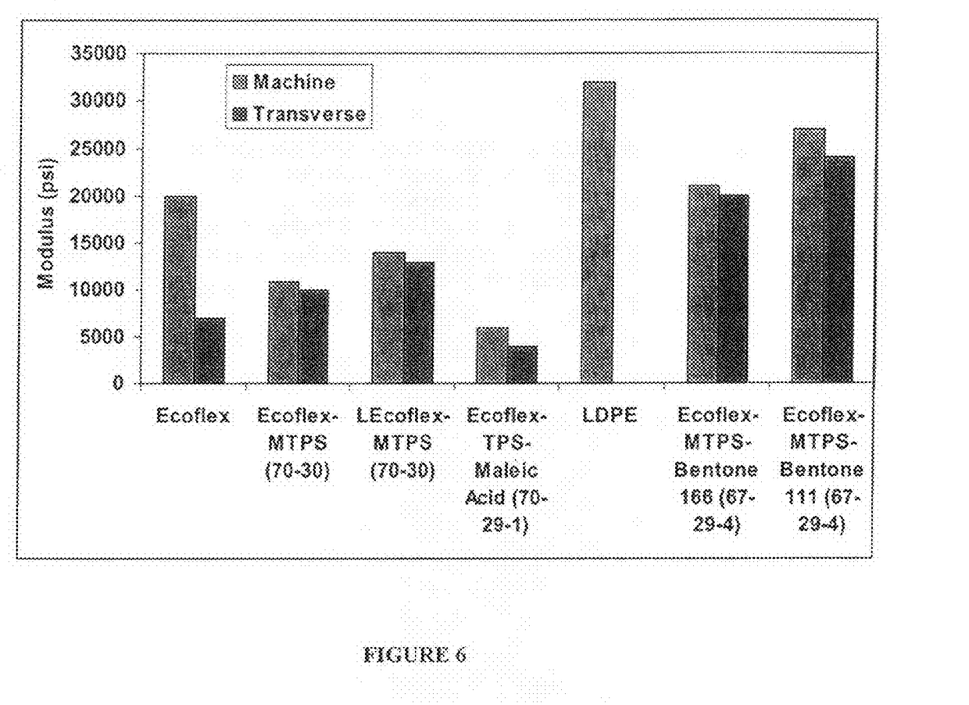
FIG. 6 shows bar graphs depicting modulus of elasticity values of ECOFLEX™, graft copolymer of ECOFLEX™ with CMPS, graft copolymer of cross-linked ECOFLEX™ with CMPS, graft copolymer of ECOFLEX™ with PS and LDPE.
Figure 7:
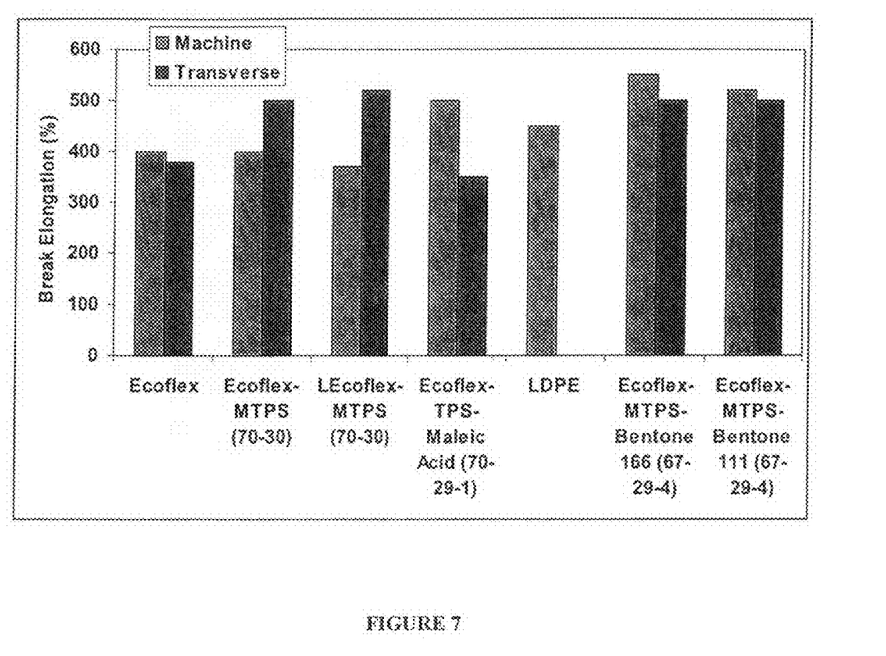
FIG. 7 shows bar graphs depicting break elongation values of ECOFLEX™, graft copolymer of ECOFLEX™ with CMPS, graft copolymer of cross-linked ECOFLEX™ with CMPS, graft copolymer of ECOFLEX™ with PS and LDPE.

Tensile properties of the films were determined using INSTRON™ Mechanical Testing Equipment fitted with a 100 lbs load cell. The crosshead speed was 1 inch per minute. Rectangular film samples, 4'×1' dimension were conditioned at 23° C. and 50% Relative Humidity for 40 hours before being tested according to ASTM D-882 testing. The results of the testing are shown in FIGS. 4, 5 and 6. It is observed that the tensile strength and modulus of elasticity values of ECOFLEX™-PS graft copolymer, containing around 30% PS, exhibit almost a six fold decrease as compared to pure ECOFLEX™ polyester values. However, ECOFLEX™/CMPS graft copolymers and cross-linked ECOFLEX™ (ECOFLEX)/CMPS graft copolymers exhibit tensile values comparable to LDPE. Also, on incorporation of clay in the production of Ecoflex™/CMPS, the film tensile strength further improves to about 2800-3000 psi (twice as much as ECOFLEX™/CMPS). Break elongation values of the graft copolymer are higher than ECOFLEX™ and LDPE. Tear and Puncture properties, determined according to ASTM D1922 and ASTM F1306 respectively, were found to be comparable to LDPE. (Table 4)

TABLE 4

Tear and Puncture properties of ECOFLEX-CMPS (70/30) graft copolymer

| Material | Thickness (in) | Tear (g) MD ASTM D1922 | Tear (g) CMD ASTM D1922 | Puncture Max. (lb$_f$) ASTM F1306 | Puncture Ext. (in) ASTM F1306 |
|---|---|---|---|---|---|
| LDPE | 0.0010-0.0015 | 100-300 | — | 1.5-3.0 | — |
| Ecoflex-MTPS (70/30) graft copolymer | 0.0010-0.0015 | 767.7 | 802.7 | 1.515 | 0.6219 |

The above examples demonstrate that the present invention provides new starch-based graft copolymers which utilize agricultural resources that can be returned back to nature in an environmentally sound manner. The polymeric materials made in accordance with the present invention are environmentally compatible, this being achieved by designing and engineering fully biodegradable materials that are thermoplastic, yet breakdown under appropriate environmental conditions in a manner similar to their lignocellulosic counterparts.

It is intended that the foregoing description be only illustrative of the present invention and that the present invention be limited only by the hereinafter appended claims.

We claim:

1. A starch-polyester graft copolymer composition comprising:
   (a) a chemically modified starch, the chemically modified starch comprising a reaction product of a reactively blended mixture comprising: (i) a starch, (ii) a trans-esterification catalyst comprising one or more of a dibasic organic acid and an anhydride thereof, (iii) a plasticizer comprising a polyhydric alcohol, and (iv) optionally, a free-radical initiator; and
   (b) segments of a biodegradable aliphatic polyester grafted onto the chemically modified starch through an ester linkage.

2. The starch-polyester graft copolymer composition of claim 1, wherein the biodegradable aliphatic polyester comprises poly(caprolactone).

3. The starch-polyester graft copolymer composition of claim 1, wherein the biodegradable aliphatic polyester comprises one or more of poly(lactic acid), poly(lactide), poly(glycolic acid), and poly(glycolide).

4. The starch-polyester graft copolymer composition of claim 1, wherein the biodegradable aliphatic polyester comprises a poly(β-hydroxyalkanoate).

5. The starch-polyester graft copolymer composition of claim 1, wherein the biodegradable aliphatic polyester comprises where R is lower alkyl and aromatic groups containing 1 to 12 carbon atoms; n is 0 to 10; and x is 200 to 2000.

6. The starch-polyester graft copolymer composition of claim 1, wherein the biodegradable aliphatic polyester comprises where n is 1 to 10 and x is 200 to 2000.

7. The starch-polyester graft copolymer composition of claim 1, wherein the starch is selected from the group consisting of corn, potato, wheat, rice, sago, tapioca, waxy maize, sorghum, cassava, high amylose starch, and combinations thereof.

8. The starch-polyester graft copolymer composition of claim 7, wherein the starch is a native starch.

9. The starch-polyester graft copolymer composition of claim 1, wherein the trans-esterification catalyst is selected from the group consisting of maleic acid, succinic acid, itaconic acid, phthalic acid, anhydrides thereof, and mixtures thereof.

10. The starch-polyester graft copolymer composition of claim 1, wherein the polyhydric alcohol is selected from the group consisting of glycerol, sorbitol, ethylene glycol, and mixtures thereof.

11. The starch-polyester graft copolymer composition of claim 1, wherein the starch-polyester graft copolymer composition further comprises a nanoclay selected from the group consisting of montmorillonite, smectite, hectorite, and mixtures thereof.

12. The starch-polyester graft copolymer composition of claim 1, wherein:
   (i) the biodegradable aliphatic polyester is present in an amount from 60% to 90% by weight relative to the starch-polyester graft copolymer composition;
   (ii) the starch is present in an amount from 50% to 80% by weight relative to the chemically modified starch;
   (iii) the trans-esterification catalyst is present in an amount from 0.1% to 10% by weight relative to the chemically modified starch;
   (iv) the plasticizer in an amount from 10% to 50% by weight relative to the chemically modified starch.

13. The starch-polyester graft copolymer composition of claim 1, wherein the starch-polyester graft copolymer composition is completely biodegradable.

14. The starch-polyester graft copolymer composition of claim 1, wherein the starch-polyester graft copolymer composition is free of non-biodegradable polymers.

15. The starch-polyester graft copolymer composition of claim 1, wherein the starch-polyester graft copolymer composition has been formed by reactively blending a mixture comprising the chemically modified starch and the biodegradable aliphatic polyester at a temperature which grafts segments of the biodegradable aliphatic polyester onto the starch.

16. The starch-polyester graft copolymer composition of claim 15, wherein the reactively blended mixture is melt extruded at a temperature between about 100° C. to about 200° C. with heating and venting of water and unreacted trans-esterification catalyst from the mixture while melt extruding the mixture.

17. The starch-polyester graft copolymer composition of claim 15, wherein the reactively blended mixture is free of free-radical initiators.

18. A process for the preparation of a starch-polyester graft copolymer composition, the process comprising:
   (a) providing a chemically modified starch, the chemically modified starch comprising a reaction product of a reactively blended mixture comprising: (i) a starch, (ii) a trans-esterification catalyst comprising one or more of a dibasic organic acid and an anhydride thereof, (iii) a plasticizer comprising a polyhydric alcohol, and (iv) optionally, a free-radical initiator; and
   (b) blending a mixture comprising (i) the chemically modified starch and (ii) a biodegradable aliphatic polyester at a temperature which grafts segments of the biodegradable aliphatic polyester onto the chemically modified starch through an ester linkage, thereby forming the starch-polyester graft copolymer composition.

19. The process of claim 18, wherein the biodegradable aliphatic polyester comprises poly(caprolactone).

20. The process of claim 18, wherein the biodegradable aliphatic polyester comprises one or more of poly(lactic acid), poly(lactide), poly(glycolic acid), and poly(glycolide).

21. The process of claim 18, wherein the biodegradable aliphatic polyester comprises a poly(β-hydroxyalkanoate).

22. The process of claim 18, wherein the biodegradable aliphatic polyester comprises where R is lower alkyl and aromatic groups containing 1 to 12 carbon atoms; n is 0 to 10; and x is 200 to 2000.

23. The process of claim 18, wherein the biodegradable aliphatic polyester comprises where n is 1 to 10 and x is 200 to 2000.

24. The process of claim 18, wherein the starch is selected from the group consisting of corn, potato, wheat, rice, sago, tapioca, waxy maize, sorghum, cassava, high amylose starch, and combinations thereof.

25. The process of claim 24, wherein the starch is a native starch.

26. The process of claim 18, wherein the trans-esterification catalyst is selected from the group consisting of maleic acid, succinic acid, itaconic acid, phthalic acid, anhydrides thereof, and mixtures thereof.

27. The process of claim 18, wherein the trans-esterification catalyst comprises the dibasic organic acid produced in situ in the blending step (b) by reaction of an anhydride of the dibasic organic acid with water contained in the starch.

28. The process of claim 18, wherein the polyhydric alcohol is selected from the group consisting of glycerol, sorbitol, ethylene glycol, and mixtures thereof.

29. The process of claim 18, wherein the reactively blended mixture forming the chemically modified starch comprises a peroxide initiator as the free-radical initiator.

30. The process of claim 18, wherein the mixture of blending step (b) is free of free-radical initiators.

31. The process of claim 18, wherein the starch-polyester graft copolymer composition further comprises a nanoclay added to the chemically modified starch, the mixture in blending step (b), or both.

32. The process of claim 31, wherein the nanoclay is selected from the group consisting of montmorillonite, smectite, hectorite, and mixtures thereof.

33. The process of claim 18, wherein blending step (b) comprises: (i) melt extruding the mixture at a temperature between about 100° C. to about 200° C. and (ii) heating and venting of water and unreacted trans-esterification catalyst from the mixture while melt extruding the mixture.

34. The process of claim 18, wherein step (a) comprises reactively blending a mixture comprising: (i) the starch, (ii) the trans-esterification catalyst, (iii) the plasticizer, and (iv) optionally, the free-radical initiator.

35. The process of claim 18, wherein:
   (i) the biodegradable aliphatic polyester is present in an amount from 60% to 90% by weight relative to the starch-polyester graft copolymer composition;
   (ii) the starch is present in an amount from 50% to 80% by weight relative to the chemically modified starch;
   (iii) the starch has a moisture content of about 0.5% to 15% by weight before formation of the chemically modified starch by reactive blending;

(iv) the trans-esterification catalyst is present in an amount from 0.1% to 10% by weight relative to the chemically modified starch;

(v) the plasticizer in an amount from 10% to 50% by weight relative to the chemically modified starch.

36. The process of claim 18, wherein the starch-polyester graft copolymer composition is completely biodegradable.

37. The process of claim 18, wherein the starch-polyester graft copolymer composition is free of non-biodegradable polymers.

38. A starch-polyester graft copolymer composition comprising:
- (a) a chemically modified starch, the chemically modified starch comprising a reaction product of a reactively blended mixture comprising: (i) a starch, (ii) a trans-esterification catalyst comprising one or more of a dibasic organic acid and an anhydride thereof, (iii) a plasticizer comprising a polyhydric alcohol, and (iv) optionally, a free-radical initiator; and
- (b) segments of a biodegradable aliphatic-aromatic copolyester grafted onto the chemically modified starch through an ester linkage.

39. The starch-polyester graft copolymer composition of claim 38, wherein the starch is selected from the group consisting of corn, potato, wheat, rice, sago, tapioca, waxy maize, sorghum, cassaya, high amylose starch, and combinations thereof.

40. The starch-polyester graft copolymer composition of claim 38, wherein the trans-esterification catalyst is selected from the group consisting of maleic acid, succinic acid, itaconic acid, phthalic acid, anhydrides thereof, and mixtures thereof.

41. The starch-polyester graft copolymer composition of claim 38, wherein the polyhydric alcohol is selected from the group consisting of glycerol, sorbitol, ethylene glycol, and mixtures thereof.

42. The starch-polyester graft copolymer composition of claim 38, wherein the starch-polyester graft copolymer composition further comprises a nanoclay selected from the group consisting of montmorillonite, smectite, hectorite, and mixtures thereof.

43. A process for the preparation of a starch-polyester graft copolymer composition, the process comprising:
- (a) providing a chemically modified starch, the chemically modified starch comprising a reaction product of a reactively blended mixture comprising: (i) a starch, (ii) a trans-esterification catalyst comprising one or more of a dibasic organic acid and an anhydride thereof, (iii) a plasticizer comprising a polyhydric alcohol, and (iv) optionally, a free-radical initiator; and
- (b) blending a mixture comprising (i) the chemically modified starch and (ii) a biodegradable aliphatic-aromatic copolyester at a temperature which grafts segments of the biodegradable aliphatic-aromatic copolyester onto the chemically modified starch through an ester linkage, thereby forming the starch-polyester graft copolymer composition.

44. The process of claim 43, wherein the starch is selected from the group consisting of corn, potato, wheat, rice, sago, tapioca, waxy maize, sorghum, cassaya, high amylose starch, and combinations thereof.

45. The process of claim 43, wherein the trans-esterification catalyst is selected from the group consisting of maleic acid, succinic acid, itaconic acid, phthalic acid, anhydrides thereof, and mixtures thereof.

46. The process of claim 43, wherein the polyhydric alcohol is selected from the group consisting of glycerol, sorbitol, ethylene glycol, and mixtures thereof.

47. The process of claim 43, wherein the starch-polyester graft copolymer composition further comprises a nanoclay added to the chemically modified starch, the mixture in blending step (b), or both.

* * * * *